United States Patent
Collier-Hallman

(10) Patent No.: US 9,531,311 B2
(45) Date of Patent: Dec. 27, 2016

(54) GENERATION OF A CURRENT REFERENCE TO CONTROL A BRUSHLESS MOTOR

(71) Applicant: Steering Solutions IP Holding Corporation, Saginaw, MI (US)

(72) Inventor: Steven J. Collier-Hallman, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 410 days.

(21) Appl. No.: 14/090,484

(22) Filed: Nov. 26, 2013

(65) Prior Publication Data

US 2014/0265953 A1 Sep. 18, 2014

Related U.S. Application Data

(60) Provisional application No. 61/778,857, filed on Mar. 13, 2013.

(51) Int. Cl.
  *H02P 7/06* (2006.01)
  *B62D 5/04* (2006.01)

(52) U.S. Cl.
  CPC ............. *H02P 7/06* (2013.01); *B62D 5/046* (2013.01); *B62D 5/0463* (2013.01); *B62D 5/0481* (2013.01); *H02P 21/22* (2016.02)

(58) Field of Classification Search
  CPC ...... H02P 7/06; H02P 21/0035; B62D 5/0463; B62D 5/046

(Continued)

(56) References Cited

U.S. PATENT DOCUMENTS 8,018,185 B2 9/2011 Yamamoto et al.
8,154,228 B2 4/2012 Yundt et al.
(Continued)

FOREIGN PATENT DOCUMENTS

CN 1138234 12/1996
CN 1754305 3/2006
(Continued)

OTHER PUBLICATIONS

European Application No. 14158557.0 Extended European Search Report dated Mar. 5, 2015, 4 pages.
(Continued)

*Primary Examiner* — Kawing Chan
(74) *Attorney, Agent, or Firm* — Cantor Colburn LLP

(57) ABSTRACT

A current reference generator to control a brushless motor in a motor control system is provided. The current reference generator includes a locate peak torque module that determines a maximum possible torque and a direct axis current that corresponds to the maximum possible torque based on motor parameters, a maximum voltage, a motor velocity of the brushless motor, and a sign of a torque command. A limit torque command module limits the torque command to the maximum possible torque. A locate minimum current module determines a value of the direct axis current that results in a minimum motor current. A solve current reference module generates a reference vector that satisfies the torque command as limited by the direct axis current that corresponds to the maximum possible torque and the direct axis current that results in the minimum motor current.

18 Claims, 9 Drawing Sheets

(58) Field of Classification Search
USPC .............. 318/400.01, 400.02, 700
See application file for complete search history.

(56) References Cited

U.S. PATENT DOCUMENTS

| | | | |
|---|---|---|---|
| 8,744,794 | B2 | 6/2014 | Wu et al. |
| 2005/0057208 | A1 | 3/2005 | Seibel et al. |
| 2006/0132074 | A1 | 6/2006 | Yang et al. |
| 2007/0205743 | A1 | 9/2007 | Takahashi et al. |
| 2009/0059446 | A1 | 3/2009 | Matsui et al. |
| 2009/0295316 | A1 | 12/2009 | Patel et al. |
| 2010/0219780 | A1 | 9/2010 | Morimoto et al. |
| 2010/0264860 | A1 | 10/2010 | Jun et al. |
| 2010/0277111 | A1* | 11/2010 | Kitanaka ............ H02P 21/0035 318/400.02 |
| 2011/0043149 | A1 | 2/2011 | Kitanaka |
| 2011/0148335 | A1 | 6/2011 | Harakawa et al. |
| 2011/0175558 | A1 | 7/2011 | Kitanaka |
| 2011/0241578 | A1 | 10/2011 | Kim et al. |
| 2012/0221280 | A1 | 8/2012 | Wu et al. |
| 2014/0253000 | A1 | 9/2014 | Gebregergis et al. |
| 2014/0265951 | A1 | 9/2014 | Gebregergis et al. |

FOREIGN PATENT DOCUMENTS

| | | |
|---|---|---|
| CN | 101479925 | 7/2009 |
| CN | 101507101 | 8/2009 |
| CN | 101902185 | 12/2010 |
| CN | 102545766 | 7/2012 |
| CN | 102594250 | 7/2012 |
| CN | 102694498 | 9/2012 |
| EP | 1115196 A2 | 7/2001 |
| JP | H1198891 A | 4/1999 |
| JP | 2000037098 A | 2/2000 |
| JP | 2004056839 A | 2/2004 |
| JP | 4657215 | 3/2011 |

OTHER PUBLICATIONS

U.S. Appl. No. 13/792,565 Notice of Allowance dated Oct. 26, 2015, 11 pages.
U.S. Appl. No. 13/795,261 Notice of Allowance dated Jan. 5, 2016, 11 pages.
CN Patent Application No. 201410092806.8 First Office Action and Search Report issued Feb. 2, 2016, 9 pages.
China Patent Application No. 201410145809.3 First Office Action and Search Report issued Dec. 31, 2015, 10 pages.
China Application No. 201410089156.1 First Office Action and Search Report dated Dec. 30, 2015, 9 pages.
China Patent Application No. 201410145809.3 Second Office Action Issued on Sep. 13, 2016, 9 pages.

* cited by examiner

GENERATION OF A CURRENT REFERENCE TO CONTROL A BRUSHLESS MOTOR

CROSS-REFERENCE TO RELATED APPLICATIONS

This patent application claims priority to U.S. Provisional Patent Application Ser. No. 61/778,857, filed on Mar. 13, 2013, which is incorporated herein by reference in its entirety.

BACKGROUND OF THE INVENTION

Electronic steering motors use current or voltage control to obtain the desired operating torque. In order to control voltage controlled surface magnet brushless motors, a voltage reference vector in polar coordinates is typically generated such that the efficiency is maximized until the magnitude of the voltage approaches the DC input voltage to the controller. After that, the phase angle is changed to obtain the desired torque with the limited voltage. Alternatively, surface magnet brushless motors can be current controlled using a current reference. Another type of brushless motor is an interior permanent magnet synchronous motor, also referred to as an interior magnet motor, which is typically controlled using current control relative to a current reference but may be controlled with voltage control relative to a voltage reference as well.

SUMMARY OF THE INVENTION

A current reference generator to control a brushless motor in a motor control system is provided. The current reference generator includes a locate peak torque module that determines a maximum possible torque and a direct axis current that corresponds to the maximum possible torque based on a plurality of motor parameters, a maximum voltage, a motor velocity of the brushless motor, and a sign of a torque command. A limit torque command module limits the torque command to the maximum possible torque. A locate minimum current module determines a value of the direct axis current that results in a minimum motor current. A solve current reference module generates a reference vector that satisfies the torque command as limited by the direct axis current that corresponds to the maximum possible torque and the direct axis current that results in the minimum motor current.

A method to generate a reference vector to control a brushless motor in a motor control system is provided. The method includes determining a maximum possible torque and a direct axis current that corresponds to the maximum possible torque based on a plurality of motor parameters, a maximum voltage, a motor velocity of the brushless motor, and a sign of a torque command. The torque command is limited to the maximum possible torque. A value of the direct axis current that results in a minimum motor current is determined. A reference vector is generated that satisfies the torque command as limited by the direct axis current that corresponds to the maximum possible torque, and the direct axis current that results in the minimum motor current.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
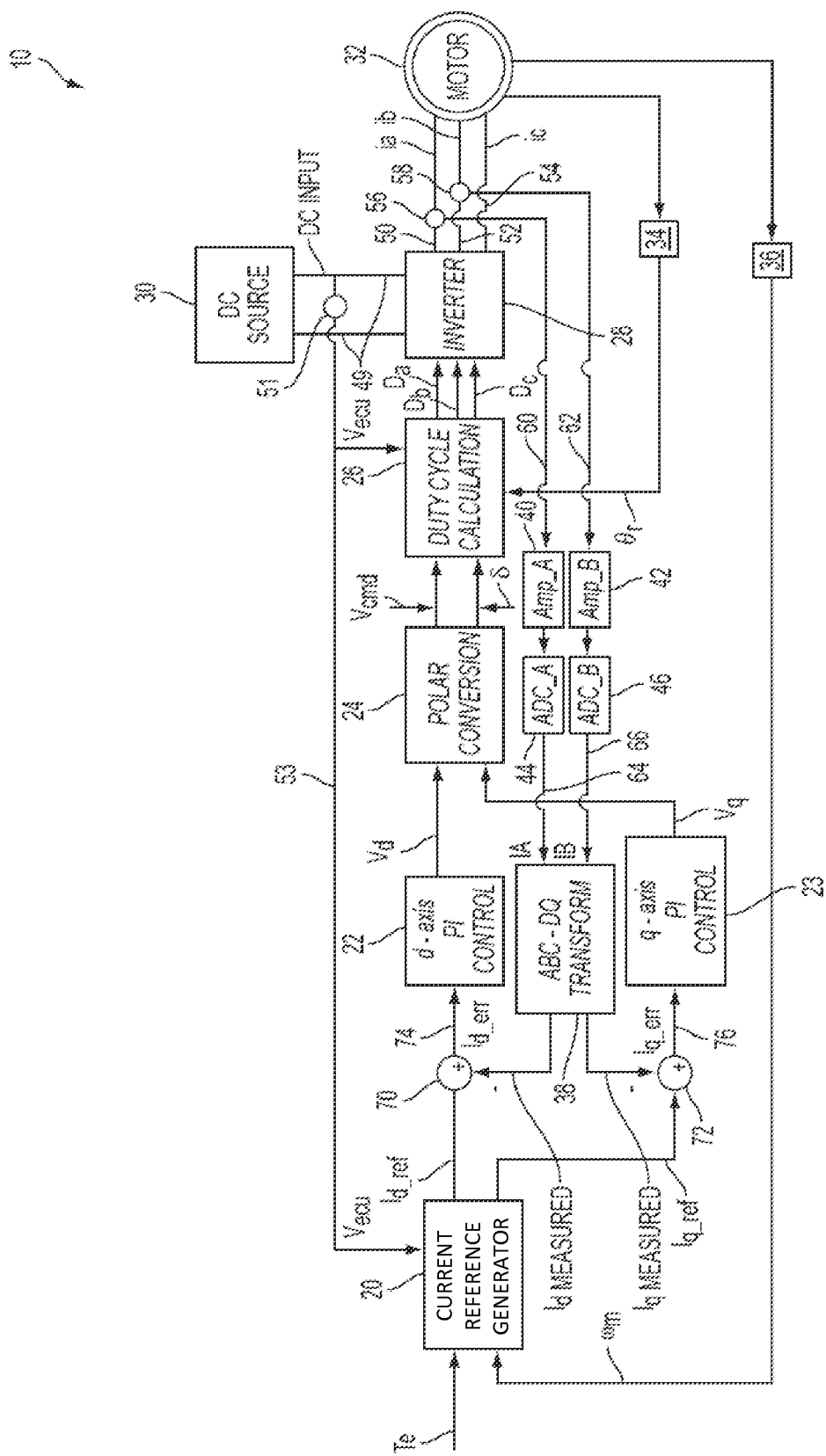
FIG. 1 is a block diagram of a motor control system in accordance with an exemplary embodiment of the invention.

Referring now to the Figures, where the invention will be described with reference to specific embodiments, without limiting same, FIG. 1 is an exemplary block diagram of a motor control system 10. The motor control system 10 includes a current reference generator 20, a d-axis proportional plus integral gain (PI) controller 22, a q-axis PI controller 23, a polar conversion controller 24, a pulse width modulation (PWM) inverter controller 26, an inverter 28, a DC power source 30, a motor 32, a position sensor 34, a speed sensor 36, a transform controller 38, an a-axis current amplifier 40, a b-axis current amplifier 42, an a-axis analog to digital converter (ADC) 44, and a b-axis ADC 46. The motor 32 may be a brushless motor, such as a surface magnet brushless motor or an interior magnet motor, controlled in a current mode of control or a voltage mode of control. The motor control system 10 may be part of an electronic power steering system (not depicted). The motor 32 may be a brushless motor configured to provide a steering assist toque based on a torque command.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the current reference generator 20 and the PWM inverter controller 26. In the exemplary embodiment as shown, the inverter 26 transmits three alternating current (AC) phase currents to the motor 32 (e.g., $i_a$, $i_b$, and $i_c$) by line 50, line 52, and line 54 for operation and control of the motor 32. The bridge voltage $V_{ecu}$ may represent a maximum voltage available for use in controlling the motor 32. Alternatively, the maximum voltage can be a percentage of the bridge voltage $V_{ecu}$, such as 90% or 95% of the bridge voltage $V_{ecu}$.

For feedback control purposes, the phase currents $i_a$ and $i_b$ transmitted to the motor 32 by lines 50 and 52 may be detected to determine the instantaneous current flow to the motor 32. Specifically, a transducer 56 may be used to monitor the phase current $i_a$ on the line 50, and a transducer 58 may be used to monitor the phase current $i_b$ on the line 52. It should be noted that although transducer 56 and transducer 58 are illustrated, only one of the lines 50 or 52 may be monitored to measure either phase current $i_a$ or phase current $i_b$. A control signal 60 representing the measured phase current $i_a$ may be sent to the a-axis current amplifier 40 from the transducer 56, and a control signal 62 representing the measured phase current $i_b$ may be sent to the b-axis current amplifier 42 from the transducer 58. An augmented or amplified value of the phase current $i_a$ is then sent to the a-axis ADC 44 from the a-axis current amplifier 40, and an amplified value of the phase current $i_b$ 62 is sent to the b-axis ADC 46 from the b-axis current amplifier 42. The a-axis ADC 44 converts the amplified value of the phase current $i_a$ into a digital value 64. The digital value 64 represent the magnitude of the phase current $i_a$. The b-axis ADC 46 converts the amplified value of the phase current $i_b$ into a digital value 66. The digital value 66 represents the magnitude of the phase current $i_b$.

The transform controller 38 receives as input the digital value 64 from the ADC 44 and the digital value 66 from the ADC 46. In one embodiment, the transform controller 38 is a three-phase to two-phase transformation controller where measured values for the AC current (e.g., the digital value 64 representing the phase current $i_a$ and the digital value 66 representing the phase current $i_b$) are converted into equivalent measured DC current components, which are a measured d-axis current $I_{dMEASURED}$ and a measured q-axis current $I_{qMEASURED}$. The measured d-axis current $I_{dMEASURED}$ is sent to a subtractor 70 and the measured q-axis current $I_{qMEASURED}$ is sent to a subtractor 72.

The current reference generator 20 receives as input a torque command $T_e$, an angular speed $\omega_m$, and the control signal 53 representing the bridge voltage $V_{ecu}$ from the transducer 51. The torque command $T_e$ represents a commanded torque value, and may be derived from another controller (not shown), or may correspond to a torque value generated by an operator. The angular speed $\omega_m$ is measured by the speed sensor 36. The speed sensor 36 may include, for example, an encoder and a speed calculation circuit for calculating the angular speed of a rotor (not shown) of the motor 32 based on a signal received by the encoder. The current reference generator 20 calculates a reference d-axis current $I_{d\_REF}$ and a reference q-axis current $I_{q\_REF}$ based on the torque command $T_e$, the bridge voltage $V_{ecu}$, and the angular speed $\omega_m$, which is described below. The reference d-axis current $I_{d\_REF}$ is sent to the subtractor 70, and the reference q-axis current $I_{q\_REF}$ is sent to the subtractor 72.

The subtractor 70 receives the measured d-axis current $I_{dMEASURED}$ and the reference d-axis current $I_{d\_REF}$. The subtractor 70 determines a d-axis error signal 74 based on the measured d-axis current $I_{dMEASURED}$ and the reference d-axis current $I_{d\_REF}$. The d-axis error signal 74 represents the error between the measured d-axis current $I_{dMEASURED}$ and the reference d-axis current $I_{d\_REF}$. The subtractor 72 receives the measured q-axis current $I_{qMEASURED}$ and the reference q-axis current $I_{q\_REF}$. The subtractor 72 determines a q-axis error signal 76 based on the measured q-axis current $I_{qMEASURED}$ and the reference q-axis current $I_{q\_REF}$. The q-axis error signal 76 represents the error between the measured q-axis current $I_{qMEASURED}$ and the reference q-axis current $I_{q\_REF}$.

The d-axis PI controller 22 receives as input the d-axis error signal 74 from the subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the subtractor 72. The q-axis PI controller 23 calculates a q-axis voltage signal $V_Q$. The q-axis voltage signal $V_Q$ is based on a q-axis proportional gain $K_P$, and a q-axis integral gain $K_i$.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle $\delta$. The PWM inverter controller 26 receives as inputs the voltage command $V_{cmd}$ and the phase advance angle $\delta$ from the polar conversion controller 24. The PWM inverter controller 26 also receives a rotor angle value $\theta_r$ measured by the motor position sensor 34. In one exemplary embodiment, the PWM inverter controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the motor 32.

Figure 2:
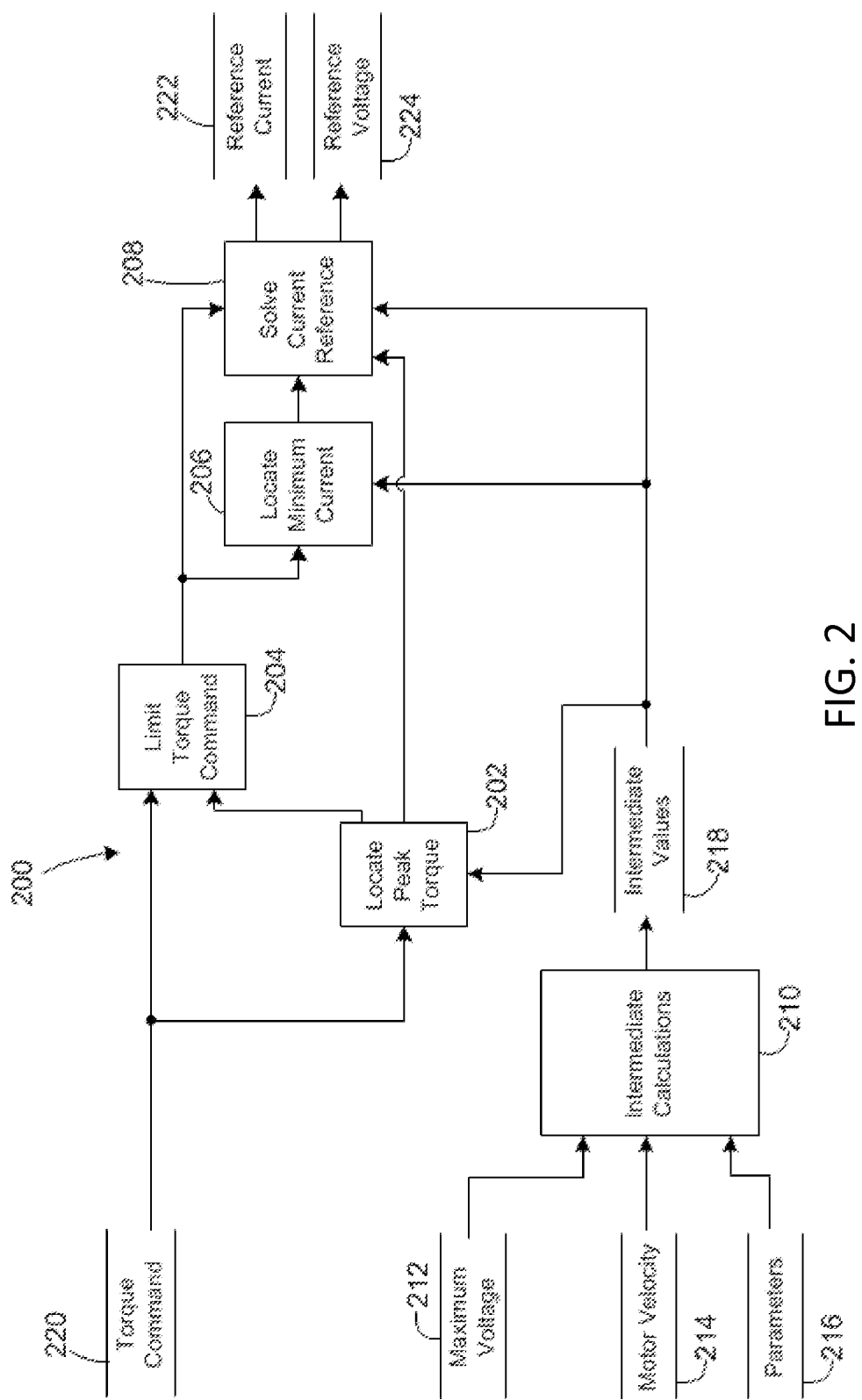
FIG. 2 is a block diagram of a current reference generator in accordance with an exemplary embodiment of the invention.

FIG. 2 is a block diagram of a current reference generator 200 in accordance with an exemplary embodiment of the invention. The current reference generator 200 is an embodiment of the current reference generator 20 of FIG. 1. In an alternate embodiment, the current reference generator 200 is used in a voltage mode system configured to operate based on a voltage reference vector, such as a brushless motor controlled in a voltage mode. As previously described, in voltage controlled motors, a voltage reference vector in polar coordinates is typically generated such that the efficiency is maximized until the magnitude of the voltage approaches the DC input voltage to the controller. After that, the phase angle is changed to obtain the desired torque with the limited voltage. However, motor control systems typically do not support both motors controlled in a voltage mode and in a current mode. In contrast, the current reference generator 200 produces both a current reference vector and voltage reference vector to support either a voltage or current controlled motor.

As used herein the term "module" refers to processing circuitry such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the modules shown in FIG. 2 can be combined and/or further partitioned to similarly generate a current reference vector and a voltage reference vector.

In the example of FIG. 2, the current reference generator 200 includes a locate peak torque module 202, a limit torque command module 204, a locate minimum current module 206, and a solve current reference module 208. The current reference generator 200 may also include an intermediate calculations module 210 that determines a plurality of intermediate values 218 based on a plurality of motor parameters 216, a maximum voltage 212, and a motor velocity 214. The intermediate values 218 can be calculated in one interval and used repeatedly over multiple intervals by the locate peak torque module 202. The intermediate values 218 can also be provided to the locate minimum current module 206 and the solve current reference module 208. The current reference generator 200 also receives a torque command 220 and generates a current reference vector 222 and a voltage reference vector 224.

The maximum voltage 212 can be the bridge voltage $V_{ecu}$ of FIG. 1 or a percentage of the bridge voltage $V_{ecu}$, such as 90% or 95% of the bridge voltage $V_{ecu}$. The motor velocity 214 may be the angular speed $\omega_m$ measured by the speed sensor 36 of FIG. 1, where the motor 32 of FIG. 1 is a brushless motor controlled by the current reference generator 200. The motor parameters 216 may be measured or estimated values for the motor 32 of FIG. 1, including, for example, a motor constant ($K_e$), a motor circuit resistance (R), a direct axis inductance ($L_d$), a quadrature axis inductance ($L_q$), and a number of poles ($N_{poles}$). The torque command 220 may be the torque command $T_e$ of FIG. 1. The current reference vector 222 can include the reference d-axis current $I_{d\_REF}$ and reference q-axis current $I_{q\_REF}$ of FIG. 1. The voltage reference vector 224 can include a reference d-axis voltage $V_{d\_REF}$ and a reference q-axis voltage $V_{q\_REF}$.

The locate peak torque module 202 determines a maximum possible torque and a direct axis current that corresponds to the maximum possible torque based on the motor parameters 216, the maximum voltage 212, and a sign of the torque command 220. The locate peak torque module 202 may be further configured to rotate a voltage vector in a circle for a finite number of steps, map the voltage vector to a current vector, create a bracket array of torque values based on the current vector, and search the bracket array for the maximum possible torque. The locate peak torque module 202 can be further configured to adjust any of the bracket arrays having an angle of zero to wrap the angle, and perform iterative parabolic interpolation to refine a location of the maximum possible torque.

The limit torque command module 204 limits the torque command 220 to the maximum possible torque. The locate minimum current module 206 determines a value of the direct axis current that results in a minimum motor current. The locate minimum current module 206 may be further configured to perform iterative parabolic interpolation using a direct axis current of zero, a direct axis current equal to the torque command divided by a motor constant, and half of the torque command divided by the motor constant as initial points for the iterative parabolic interpolation.

The solve current reference module 208 generates a reference vector that satisfies the torque command 220 as limited by the direct axis current that corresponds to the maximum possible torque and the direct axis current that results in the minimum motor current. The solve current reference module 208 is further configured to perform a minimum test to set the reference vector to a minimum value based on determining that the direct axis current that results in the minimum motor current satisfies the torque command 220. The solve current reference module 208 is also configured to perform a maximum test to set the reference vector to a maximum value based on determining that the direct axis current that corresponds to the maximum possible torque does not satisfy the torque command 220. An interval bisection search is performed based on determining that minimum test and the maximum test are not met. The solve current reference module 208 is further configured to compute the current reference vector 222 and the voltage reference vector 224. The solve current reference module 208 can be configured to set the current reference vector 222 as the reference vector that satisfies the torque command 220, where the brushless motor is controlled in a current mode. Alternatively, the solve current reference module 208 can be configured to set the voltage reference vector 224 as the reference vector that satisfies the torque command 220, where the brushless motor is controlled in a voltage mode.

Figure 3:
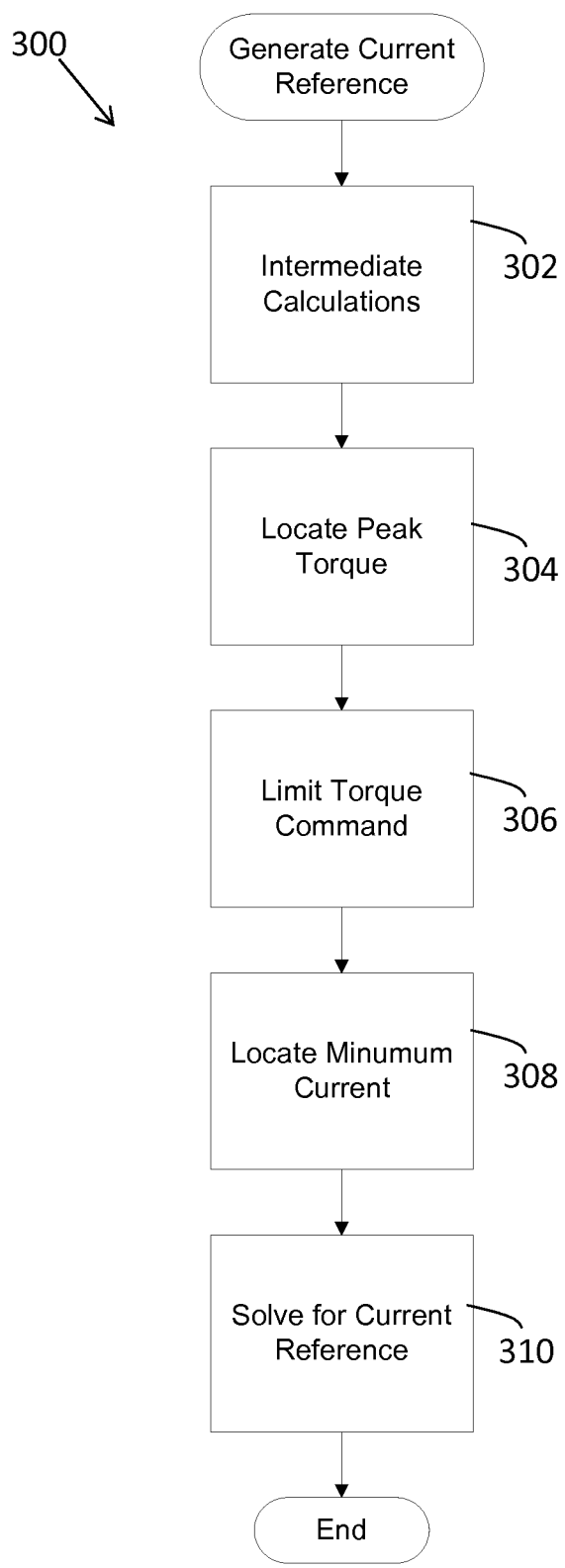
FIG. 3 is a process flow diagram for generating a reference vector to control a brushless motor in a motor control system in accordance with an exemplary embodiment of the invention.

FIG. 3 is a process flow diagram 300 for generating a reference vector to control a brushless motor in a motor control system in accordance with an exemplary embodiment of the invention. The process 300 can be performed by the current reference generator 200 of FIG. 2 as an embodiment of the current reference generator 20 of FIG. 1 or other configurations, e.g., in a surface or interior magnet motor control system. Accordingly, FIG. 3 is described in reference to FIGS. 1-3.

At block 302, intermediate calculations can be performed by the intermediate calculations module 210 to determine a plurality of intermediate values 218 based on the motor parameters 216, the maximum voltage 212, and the motor velocity 214, where the intermediate values 218 are calculated in one interval and used repeatedly over multiple intervals. Examples of the intermediate calculations to determine the intermediate values 218 are provided in Equations 1-11 as follows.

$$\text{Omega}_E = \text{Omega}_M * N_{poles}/2 \qquad \text{(Equation 1)}$$

$$\text{Omega}_E\_\text{div}\_R = \text{Omega}_E/R \qquad \text{(Equation 2)}$$

$$X_d\_\text{divide}\_R = \text{Omega}_E\_\text{divide}\_R * L_d \qquad \text{(Equation 3)}$$

$$X_q\_\text{divide}\_R = \text{Omega}_E\_\text{divide}\_R * L_q \qquad \text{(Equation 4)}$$

$$\text{Impedance} = 1 + X_d\_\text{divide}\_R * X_q\_\text{divide}\_R \qquad \text{(Equation 5)}$$

$$\text{Normalized}BEMF = K_e * \text{Omega}_M \qquad \text{(Equation 6)}$$

$$\text{Normalized}BEMF2 = \text{Normalized}BEMF/\text{Impedance} \qquad \text{(Equation 7)}$$

$$\text{NormalizedVoltage} = \text{MaxVoltage}/R \qquad \text{(Equation 8)}$$

$$\text{NormalizedVoltage2} = \text{NormalizedVoltage}^2 \qquad \text{(Equation 9)}$$

$$\text{NormalizedVoltage3} = \text{NormalizedVoltage}/\text{Impedance} \qquad \text{(Equation 10)}$$

$$\text{ReluctanceCoefficient} = (L_d - L_q) * N_{poles} \qquad \text{(Equation 11)}$$

At block 304, a locate peak torque process performed by the locate peak torque module 202 determines a maximum possible torque and a direct axis current that corresponds to the maximum possible torque based on the motor parameters 216, the maximum voltage 212, the motor velocity 214 of the brushless motor, and a sign of the torque command 220. The intermediate values 218 can be used to provide values associated with the motor parameters 216, the maximum voltage 212, and the motor velocity 214 to the locate peak torque module 202. Further details regarding the locate peak torque process of block 304 are described further herein in reference to FIGS. 4-8.

At block 306, the torque command 220 is limited to the maximum possible torque by the limit torque command module 204.

At block 308, a locate minimum current process performed by the locate minimum current module 206 determines a value of the direct axis current that results in a minimum motor current. Further details regarding the locate minimum current process of block 308 are described further herein in reference to FIG. 9.

At block 310, a solve for current reference process performed by the solve current reference module 208 can generate a reference vector that satisfies the torque command 220 as limited by the direct axis current that corresponds to the maximum possible torque and the direct axis current that results in the minimum motor current. Further details regarding the solve for current reference process of block 310 are described further herein in reference to FIG. 10.

Figure 4:
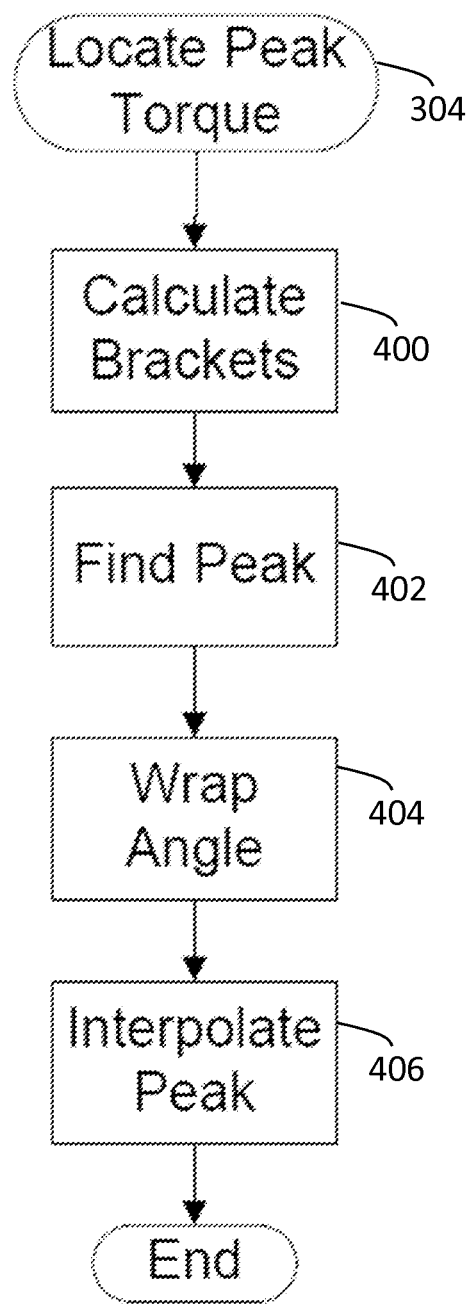
FIG. 4 is a process flow diagram to locate peak torque in accordance with an exemplary embodiment of the invention.

FIG. 4 is a process flow diagram of a locate peak torque process from block 304 of FIG. 3 in accordance with an exemplary embodiment of the invention. At block 400, a calculate brackets process is performed as described further herein in reference to FIG. 5. At block 402, a find peak process is performed as described further herein in reference to FIG. 6. At block 404, a wrap angle process is performed as described further herein in reference to FIG. 7. At block 406, an interpolate peak process is performed as described further herein in reference to FIG. 8.

Figures 5, 6:
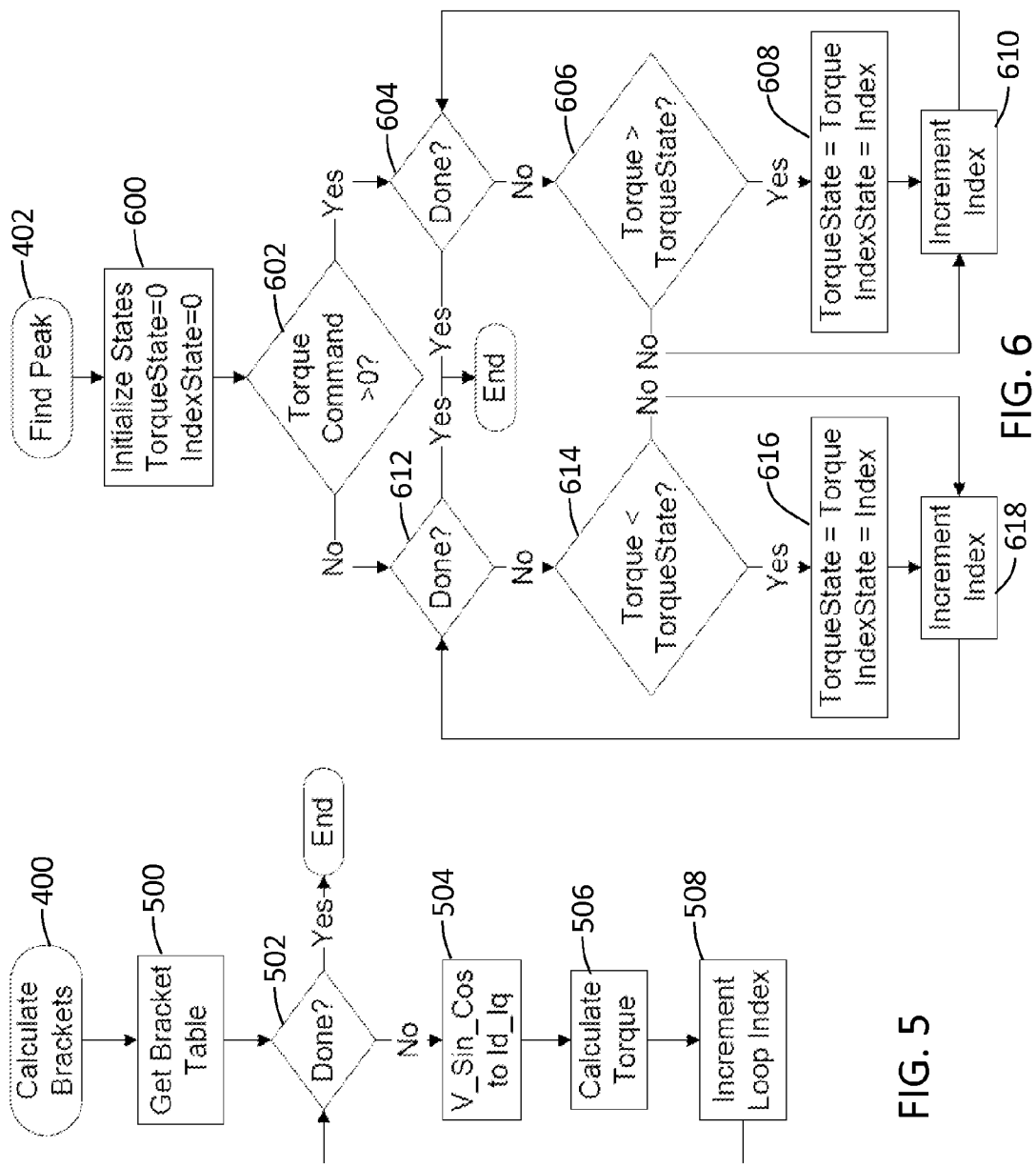
FIG. 5 is a process flow diagram to calculate brackets in accordance with an exemplary embodiment of the invention.
FIG. 6 is a process flow diagram to find a peak in accordance with an exemplary embodiment of the invention.

FIG. 5 is a process flow diagram of a calculate brackets process from block 400 of FIG. 4 in accordance with an exemplary embodiment of the invention. Bracket calculation rotates a voltage vector in a circle for a finite number of steps, maps the voltage vector to a current vector, and creates a bracket array of torque values based on the current vector. At block 500, a bracket table can be retrieved to define a finite number of steps for rotation of a voltage vector. At block 502, a determination is made as to whether looping is complete. At block 504, based on determining that looping is not complete, mapping of the voltage vector to a current vector (V_Sin_Cos to $I_d I_q$) can be performed according to Equations 12 and 13, where delta is the angle.

$$I_q=(V/(R*(1+X_d*X_q)))*(\cos(delta)+X_d*\sin(delta))-(E_g/(R*(1+X_d*X_q))) \quad \text{(Equation 12)}$$

$$I_d=I_q*X_q-\sin(delta)*V/R \quad \text{(Equation 13)}$$

At block 506, a torque value can be calculated according to Equation 14. The torque values can form a bracket array for searching.

$$\text{Torque}=(K_e+(L_d-L_q)*N_{poles}*I_d)*I_q \quad \text{(Equation 14)}$$

At block 508, a loop index is incremented to use for comparison at block 512 to determine whether looping is complete.

FIG. 6 is a process flow diagram of a find peak process from block 402 of FIG. 4 in accordance with an exemplary embodiment of the invention. The find peak process searches the bracket array formed in the calculate brackets process of FIG. 5 for the maximum possible torque. At block 600, states are initialized, where a TorqueState is set to zero and an IndexState is set to zero. At block 602, a check is performed to determine whether the torque command 220 of FIG. 2 is greater than zero. If the torque command 220 of FIG. 2 is greater than zero and the process is not done at block 604, then a check is performed at block 606 to determine whether a torque value is greater than the TorqueState. If the torque value is greater than the TorqueState, then at block 608 the TorqueState is set equal to the torque value, the IndexState is set equal to an index, and at block 610 the index is incremented. If the torque value is not greater than the TorqueState at block 606, then the index is incremented at block 610.

Returning to block 602, if the torque command 220 of FIG. 2 is not greater than zero and the process is not done at block 612, then a check is performed at block 614 to determine whether a torque value is less than the TorqueState. If the torque value is less than the TorqueState, then at block 616 the TorqueState is set equal to the torque value, the IndexState is set equal to an index, and at block 618 the index is incremented. If the torque value is not less than the TorqueState at block 614, then the index is incremented at block 618.

Figure 7:
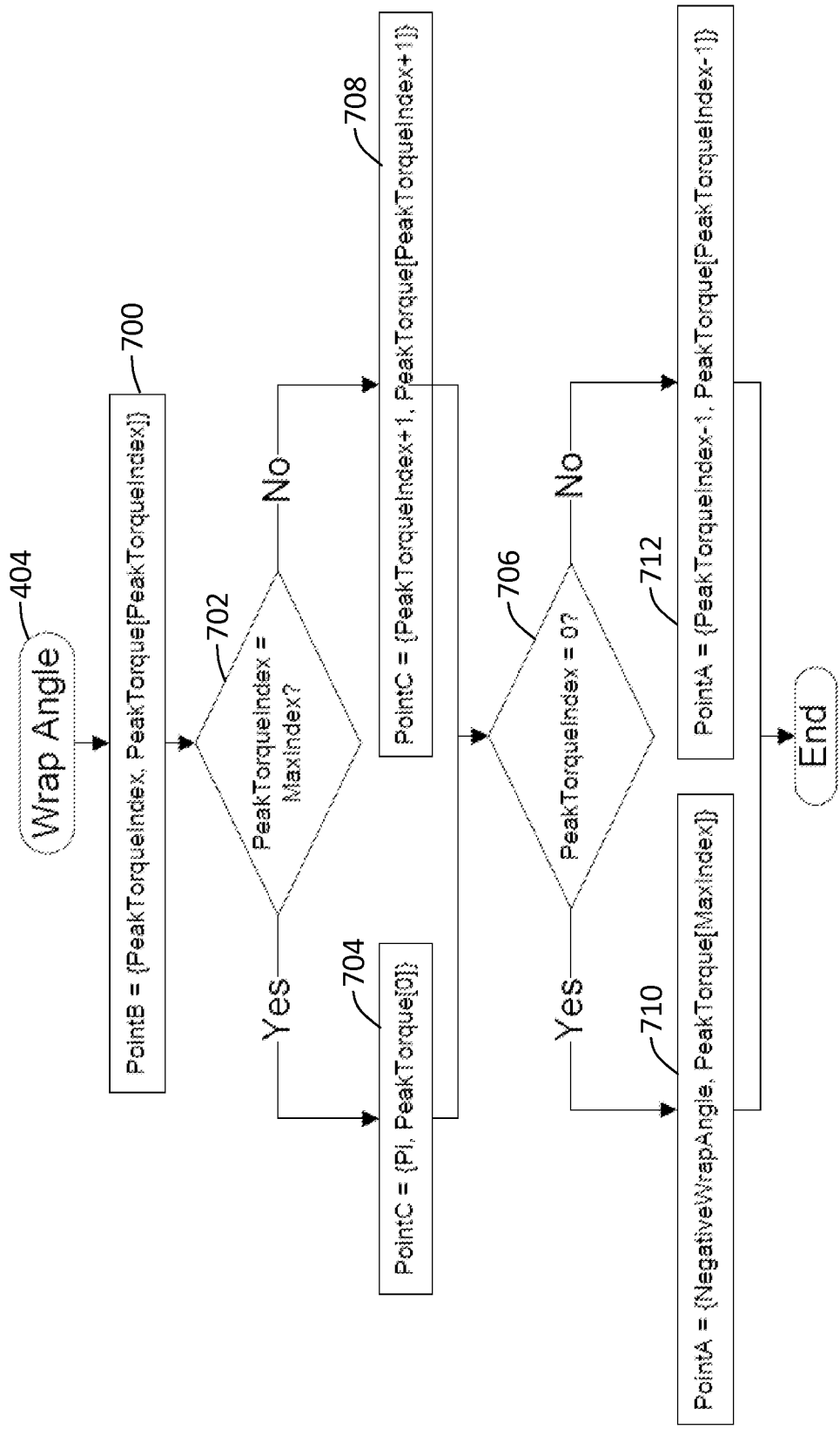
FIG. 7 is a process flow diagram to wrap an angle in accordance with an exemplary embodiment of the invention.

FIG. 7 is a process flow diagram of a wrap angle process from block 404 of FIG. 4 in accordance with an exemplary embodiment of the invention. The wrap angle process can adjust any of the bracket arrays having an angle of zero to wrap the angle. At block 700, PointB is set to {PeakTorqueIndex and PeakTorque[PeakTorqueIndex]}. At block 702, a check is performed to determine whether PeakTorqueIndex equals MaxIndex. At block 704, based on determining that PeakTorqueIndex equals MaxIndex, PointC is set to {Pi and PeakTorque[0]}, and the process continues to block 706. At block 708, based on determining that PeakTorqueIndex does not equal MaxIndex, PointC is set to {PeakTorqueIndex+1 and PeakTorque[PeakTorqueIndex+1]}, and the process continues to block 706.

At block 706, a check is performed to determine whether PeakTorqueIndex equals 0. At block 710, based on determining that PeakTorqueIndex equals 0, PointA is set to {NegativeWrapAngle, PeakToque[MaxIndex]}, and the process ends. At block 712, based on determining that PeakTorqueIndex does not equal 0, PointA is set to {PeakTorqueIndex-1 and PeakTorque[PeakTorqueIndex-1]}, and the process ends.

Figure 8:
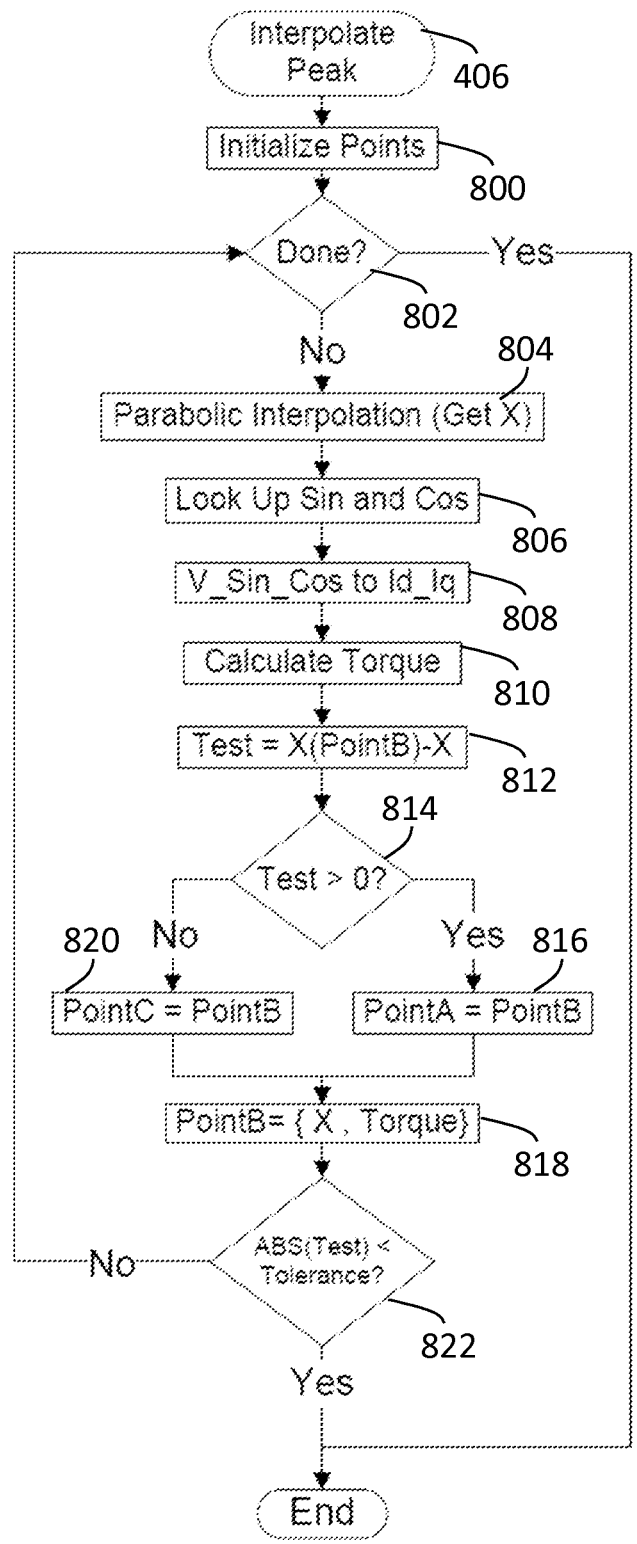
FIG. 8 is a process flow diagram to interpolate a peak in accordance with an exemplary embodiment of the invention.

FIG. 8 is a process flow diagram of an interpolate peak process from block 406 of FIG. 4 in accordance with an exemplary embodiment of the invention. The interpolate peak process can perform iterative parabolic interpolation to refine a location of the maximum possible torque. At block 800, points for interpolation are initialized. At block 802, a check is performed to determine whether the process is done. Based on determining that the process is not done, at block 804 parabolic interpolation for a value X can be performed according to Equations 15-21.

$$\text{Temp1}=fc-fb \quad \text{(Equation 15)}$$

$$\text{Temp2}=fb-fa \quad \text{(Equation 16)}$$

$$\text{Temp3}=xc-xb \quad \text{(Equation 17)}$$

$$\text{Temp4}=xb-xa \quad \text{(Equation 18)}$$

$$\text{Numerator}=\text{Temp2}*\text{Temp3}^2+\text{Temp1}*\text{Temp4}^2 \quad \text{(Equation 19)}$$

$$\text{Denominator}=\text{Temp2}*\text{Temp3}-\text{Temp1}*\text{Temp4} \quad \text{(Equation 20))}$$

$$X_{new}=xb+\text{Numerator}/(2*\text{Denominator}) \quad \text{(Equation 21)}$$

At block 806, a sine and cosine lookup operation can be performed. At block 808, a mapping of the voltage vector to a current vector (V_Sin_Cos to $I_d I_q$) can be performed according to Equations 12 and 13. At block 810, a torque value can be calculated according to Equation 14. At block 812, a test value can be determined as X(PointB)−X. At block 814, a check is performed to determine whether the test value is greater than zero. At block 816, based on determining that the test value is greater than zero, PointA is set equal to PointB and the process advances to block 818. At block 820, based on determining that the test value is not greater than zero, PointC is set equal to PointB and the process advances to block 818. At block 818, PointB is set equal to {X, torque value}. At block 822, a check is performed to determine whether the absolute value of the test value is less than a tolerance. Based on determining that the absolute value of the test value is not less than the tolerance, the process returns to block 802; otherwise, the process ends.

Figure 9:
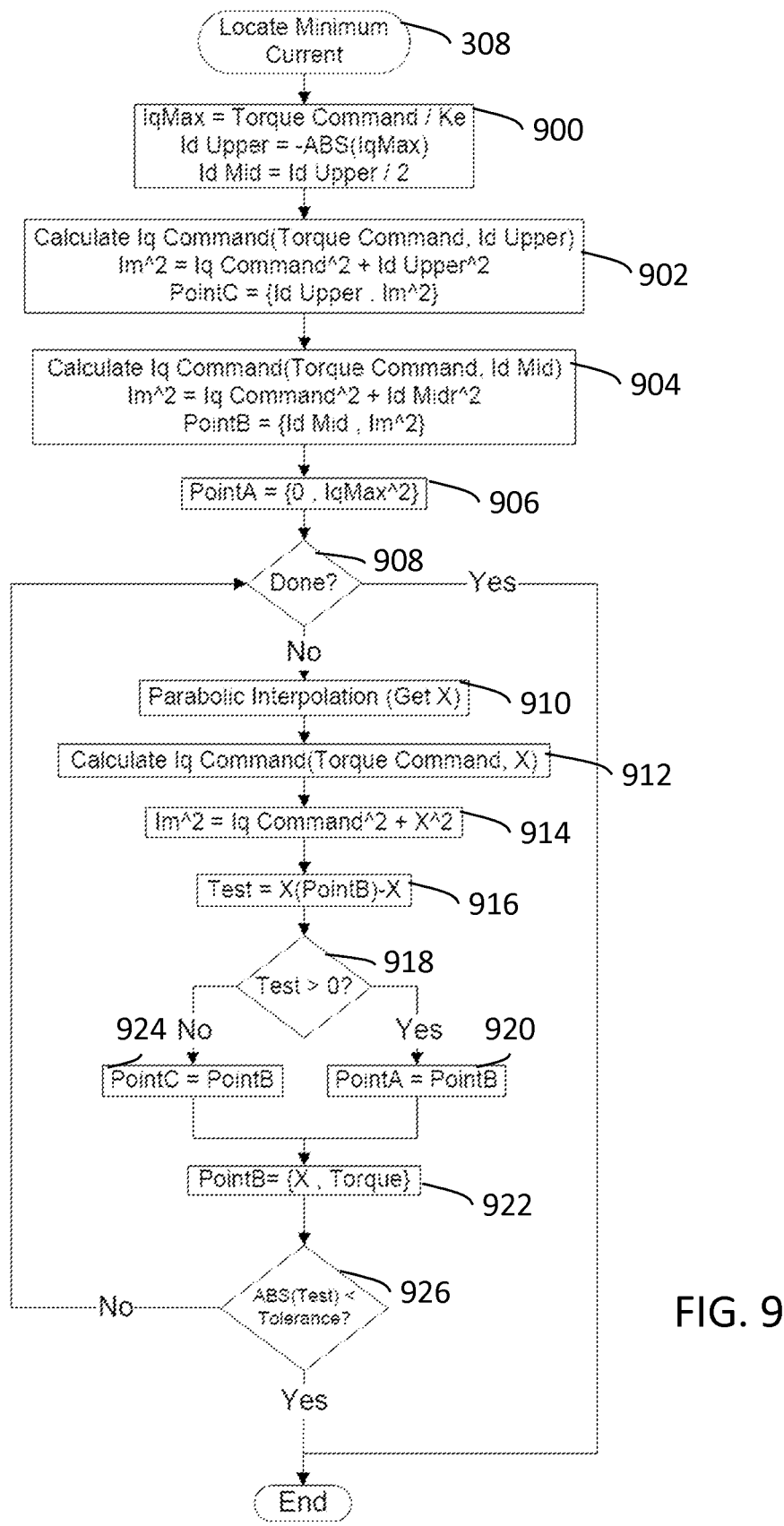
FIG. 9 is a process flow diagram to locate a minimum current in accordance with an exemplary embodiment of the invention.

FIG. 9 is a process flow diagram of a locate minimum current process from block 308 of FIG. 3 in accordance with an exemplary embodiment of the invention. The locate minimum current process can perform iterative parabolic interpolation using a direct axis current of zero, a direct axis current equal to the torque command 220 of FIG. 2 divided by the motor constant $K_e$, and half of the torque command 220 of FIG. 2 divided by the motor constant $K_e$ as initial points for the iterative parabolic interpolation. At block 900, $I_q$Max is set to the torque command 220 of FIG. 2 divided by $K_e$, $I_d$ Upper is set to the negative absolute value of $I_q$Max, and $I_d$ Mid is set to $I_d$ Upper divided by two. At block 902, an $I_q$ command is calculated for the torque command 220 of FIG. 2 and $I_d$ Upper according to Equation 22. Also, Im^2 is set equal to $I_q$ Command^2+$I_d$ Upper^2, and PointC is set to {$I_d$ Upper and Im^2}.

$$I_q = \text{Torque}/(K_e + (L_d - L_q) * N_{poles} * I_d) \quad \text{(Equation 22)}$$

At block 904, an $I_q$ command is calculated for the torque command 220 of FIG. 2 and $I_d$ Mid according to Equation 22. Also, Im^2 is set equal to $I_q$ Command^2+$I_d$ Mid^2, and PointB is set to {$I_d$ Mid and Im^2}. At block 906, PointA is set to {0 and $I_q$Max^2}.

At block 908, a check is performed to determine whether the process is done. At block 910, based on determining that the process is not done, parabolic interpolation for a value X can be performed according to Equations 15-21. At block 912, an $I_q$ command is calculated for the torque command 220 of FIG. 2 and X according to Equation 22. At block 914, Im^2 is set equal to $I_q$ Command^2+X^2. At block 916, a test value can be determined as X(PointB)−X.

At block 918, a check is performed to determine whether the test value is greater than zero. At block 920, based on determining that the test value is greater than zero, PointA is set equal to PointB and the process advances to block 922. At block 924, based on determining that the test value is not greater than zero, PointC is set equal to PointB and the process advances to block 922. At block 922, PointB is set equal to {X, torque value}. At block 926, a check is performed to determine whether the absolute value of the test value is less than a tolerance. Based on determining that the absolute value of the test value is not less than the tolerance, the process returns to block 908; otherwise, the process ends.

Figure 10:
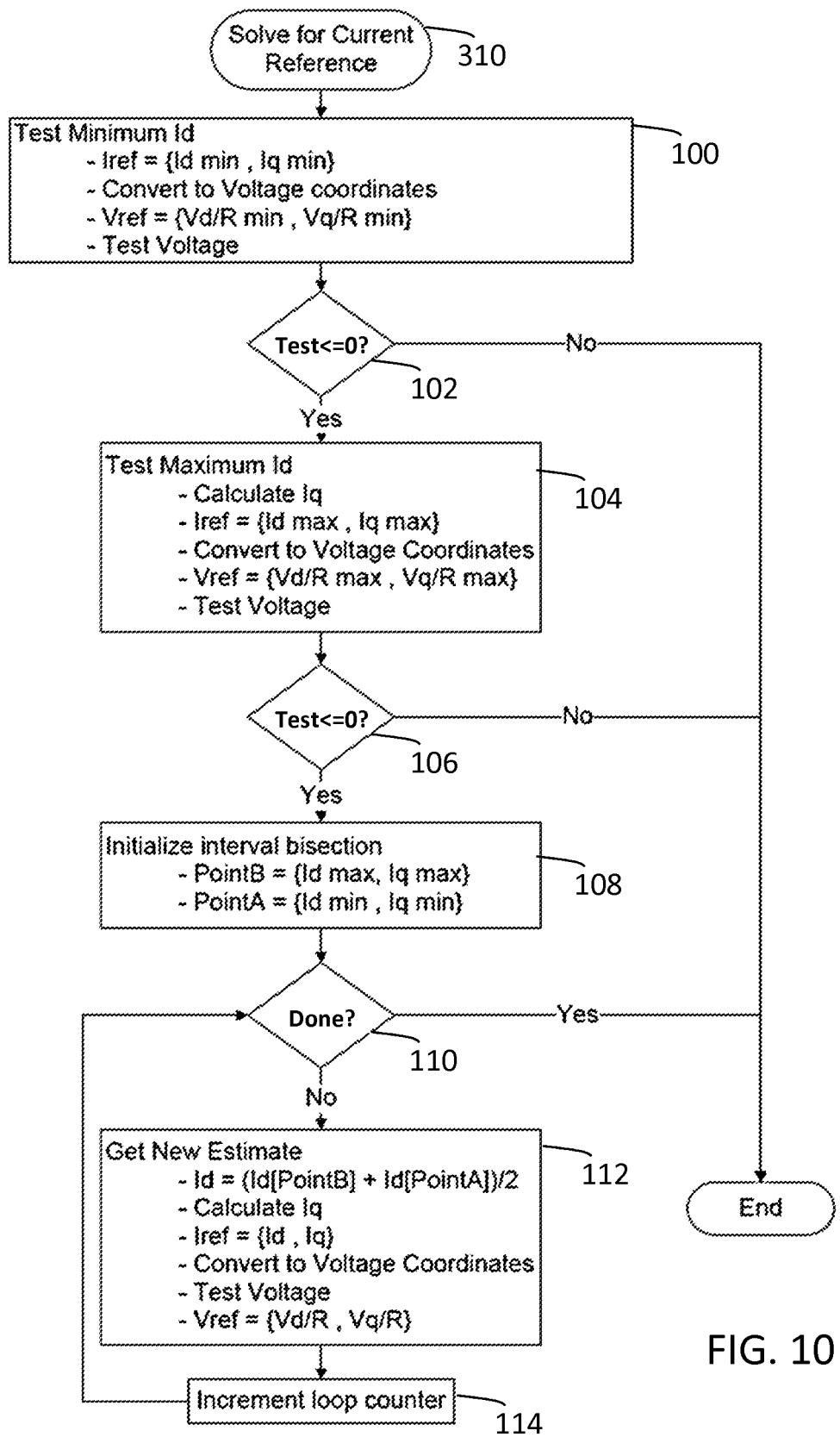
FIG. 10 is a process flow diagram to solve for a current reference in accordance with an exemplary embodiment of the invention.

FIG. 10 is a process flow diagram of a solve current reference process from block 310 of FIG. 3 in accordance with an exemplary embodiment of the invention. At block 100, a minimum test is performed to set a reference vector to a minimum value based on determining that the direct axis current that results in the minimum motor current satisfies the torque command 220 of FIG. 2. Tref is set to {$I_d$ min, $I_q$ min} and conversion to voltage coordinates can be performed according to Equations 23 and 24. Vref is set to {$V_d$/R min, $V_q$/R min}, and a voltage test can be performed according to Equation 25. Iref may be the current reference vector 222 of FIG. 2 and Vref may be the voltage reference vector 224 of FIG. 2, where either Iref or Vref can be a reference vector that satisfies the torque command 220 of FIG. 2 depending upon a control mode of the brushless motor.

$$V_q/R = I_q + X_d * I_d + E_g/R \quad \text{(Equation 23)}$$

$$V_d/R = X_q * I_q - I_d \quad \text{(Equation 24)}$$

$$\text{Test} = (V_q/R)^2 + (V_d/R)^2 - (V/R)^2 \quad \text{(Equation 25)}$$

At block 102, a check is performed to determine whether the test value is greater than or equal to zero. At block 104, based on determining that the test value is greater than or equal to zero, a maximum test is performed to set the reference vector to a maximum value based on determining that the direct axis current that corresponds to the maximum possible torque does not satisfy the torque command 220 of FIG. 2. An $I_q$ command is calculated according to Equation 22. Iref is set to {$I_d$ max, $I_q$ max} and conversion to voltage coordinates can be performed according to Equations 23 and 24. Vref is set to {$V_d$/R max, $V_q$/R max} and a voltage test can be performed according to Equation 25.

At block 106, a check is performed to determine whether the test value is less than or equal to zero. At block 108, based on determining that the test value is less than or equal to zero, an interval bisection search is initialized when the minimum test and the maximum test are not met. PointB is set to {$I_d$ max, $I_q$ max} and PointA is set to {$I_d$ min, $I_q$ min}

At block 110, a check is performed to determine whether the process is done. Based on determining that the process is not done, at block 112 a new estimate is determined. $I_d$ is set to an average of $I_d$[PointB] and $I_d$[PointA]. An $I_q$ command is calculated according to Equation 22. Iref is set to {$I_d$, $I_q$} and conversion to voltage coordinates can be performed according to Equations 23 and 24. A voltage test can be performed according to Equation 25, and Vref is set to {$V_d$/R, $V_q$/R}.

At block 114, a loop counter is incremented and the process returns to block 110.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A current reference generator to control a brushless motor in a motor control system, the current reference generator comprising:
    a locate peak torque module that determines a maximum possible torque and a direct axis current that corresponds to the maximum possible torque based on a plurality of motor parameters, a maximum voltage, a motor velocity of the brushless motor, and a sign of a torque command;
    an intermediate calculations module that determines a plurality of intermediate values based on the motor parameters, the maximum voltage, and the motor velocity, wherein the intermediate values are calculated in one interval and used repeatedly over multiple intervals by the locate peak torque module;
    a limit torque command module that limits the torque command to the maximum possible torque;
    a locate minimum current module that determines a value of the direct axis current that results in a minimum motor current; and
    a solve current reference module that generates a reference vector that satisfies the torque command as limited by the direct axis current that corresponds to the maximum possible torque and the direct axis current that results in the minimum motor current.

2. The current reference generator of claim 1, wherein the motor control system is part of an electronic power steering system, and the brushless motor is configured to provide a steering assist toque based on the torque command.

3. A current reference generator to control a brushless motor in a motor control system, the current reference generator comprising:
   a locate peak torque module that determines a maximum possible torque and a direct axis current that corresponds to the maximum possible torque based on a plurality of motor parameters, a maximum voltage, a motor velocity of the brushless motor, and a sign of a torque command, wherein the locate peak torque module is further configured to:
      rotate a voltage vector in a circle for a finite number of steps in increments based on a bracket table that defines the finite number of steps for rotation of the voltage vector;
      map the voltage vector to a current vector;
      create a bracket array of torque values based on the current vector; and
      search the bracket array for the maximum possible torque;
   a limit torque command module that limits the torque command to the maximum possible torque;
   a locate minimum current module that determines a value of the direct axis current that results in a minimum motor current; and
   a solve current reference module that generates a reference vector that satisfies the torque command as limited by the direct axis current that corresponds to the maximum possible torque and the direct axis current that results in the minimum motor current.

4. The current reference generator of claim 3, wherein the locate peak torque module is further configured to:
   perform iterative parabolic interpolation to refine a location of the maximum possible torque.

5. A current reference generator to control a brushless motor in a motor control system, the current reference generator comprising:
   a locate peak torque module that determines a maximum possible torque and a direct axis current that corresponds to the maximum possible torque based on a plurality of motor parameters, a maximum voltage, a motor velocity of the brushless motor, and a sign of a torque command;
   a limit torque command module that limits the torque command to the maximum possible torque;
   a locate minimum current module that determines a value of the direct axis current that results in a minimum motor current, wherein the locate minimum current module is further configured to perform iterative parabolic interpolation using a direct axis current of zero, a direct axis current equal to the torque command divided by a motor constant, and half of the torque command divided by the motor constant as initial points for the iterative parabolic interpolation; and
   a solve current reference module that generates a reference vector that satisfies the torque command as limited by the direct axis current that corresponds to the maximum possible torque and the direct axis current that results in the minimum motor current.

6. A current reference generator to control a brushless motor in a motor control system, the current reference generator comprising:
   a locate peak torque module that determines a maximum possible torque and a direct axis current that corresponds to the maximum possible torque based on a plurality of motor parameters, a maximum voltage, a motor velocity of the brushless motor, and a sign of a torque command;
   a limit torque command module that limits the torque command to the maximum possible torque;
   a locate minimum current module that determines a value of the direct axis current that results in a minimum motor current; and
   a solve current reference module that generates a reference vector that satisfies the torque command as limited by the direct axis current that corresponds to the maximum possible torque and the direct axis current that results in the minimum motor current, wherein the solve current reference module is further configured to:
      perform a minimum test to set the reference vector to a minimum value based on determining that the direct axis current that results in the minimum motor current satisfies the torque command;
      perform a maximum test to set the reference vector to a maximum value based on determining that the direct axis current that corresponds to the maximum possible torque does not satisfy the torque command; and
      perform an interval bisection search based on determining that minimum test and the maximum test are not met.

7. The current reference generator of claim 6, wherein the solve current reference module is further configured to compute a current reference vector and a voltage reference vector.

8. The current reference generator of claim 7, wherein the solve current reference module is further configured to set the current reference vector as the reference vector that satisfies the torque command, wherein the brushless motor is controlled in a current mode.

9. The current reference generator of claim 7, wherein the solve current reference module is further configured to set the voltage reference vector as the reference vector that satisfies the torque command, wherein the brushless motor is controlled in a voltage mode.

10. A method to generate a reference vector to control a brushless motor in a motor control system, the method comprising:
    determining a maximum possible torque and a direct axis current that corresponds to the maximum possible torque based on a plurality of motor parameters, a maximum voltage, a motor velocity of the brushless motor, and a sign of a torque command;
    determining a plurality of intermediate values based on the motor parameters, the maximum voltage, and the motor velocity, wherein the intermediate values are calculated in one interval and used repeatedly over multiple intervals;
    limiting the torque command to the maximum possible torque;
    determining a value of the direct axis current that results in a minimum motor current; and
    generating a reference vector that satisfies the torque command as limited by the direct axis current that corresponds to the maximum possible torque and the direct axis current that results in the minimum motor current.

11. The method of claim 10, wherein the motor control system is part of an electronic power steering system, and the brushless motor is configured to provide a steering assist toque based on the torque command.

12. A method to generate a reference vector to control a brushless motor in a motor control system, the method comprising:
    determining a maximum possible torque and a direct axis current that corresponds to the maximum possible torque based on a plurality of motor parameters, a maximum voltage, a motor velocity of the brushless motor, and a sign of a torque command, wherein determining the maximum possible torque further comprises:
        rotating a voltage vector in a circle for a finite number of steps in increments based on a bracket table that defines the finite number of steps for rotation of the voltage vector;
        mapping the voltage vector to a current vector;
        creating a bracket array of torque values based on the current vector; and
        searching the bracket array for the maximum possible torque;
    limiting the torque command to the maximum possible torque;
    determining a value of the direct axis current that results in a minimum motor current; and
    generating a reference vector that satisfies the torque command as limited by the direct axis current that corresponds to the maximum possible torque and the direct axis current that results in the minimum motor current.

13. The method of claim 12, further comprising:
    performing iterative parabolic interpolation to refine a location of the maximum possible torque.

14. A method to generate a reference vector to control a brushless motor in a motor control system, the method comprising:
    determining a maximum possible torque and a direct axis current that corresponds to the maximum possible torque based on a plurality of motor parameters, a maximum voltage, a motor velocity of the brushless motor, and a sign of a torque command;
    limiting the torque command to the maximum possible torque;
    determining a value of the direct axis current that results in a minimum motor current by performing iterative parabolic interpolation using a direct axis current of zero, a direct axis current equal to the torque command divided by a motor constant, and half of the torque command divided by the motor constant as initial points for the iterative parabolic interpolation; and
    generating a reference vector that satisfies the torque command as limited by the direct axis current that corresponds to the maximum possible torque and the direct axis current that results in the minimum motor current.

15. A method to generate a reference vector to control a brushless motor in a motor control system, the method comprising:
    determining a maximum possible torque and a direct axis current that corresponds to the maximum possible torque based on a plurality of motor parameters, a maximum voltage, a motor velocity of the brushless motor, and a sign of a torque command;
    limiting the torque command to the maximum possible torque;
    determining a value of the direct axis current that results in a minimum motor current; and
    generating a reference vector that satisfies the torque command as limited by the direct axis current that corresponds to the maximum possible torque and the direct axis current that results in the minimum motor current, wherein generating the reference vector further comprises:
        performing a minimum test to set the reference vector to a minimum value based on determining that the direct axis current that results in the minimum motor current satisfies the torque command;
        performing a maximum test to set the reference vector to a maximum value based on determining that the direct axis current that corresponds to the maximum possible torque does not satisfy the torque command; and
        performing an interval bisection search based on determining that minimum test and the maximum test are not met.

16. The method of claim 15, further comprising:
    computing a current reference vector and a voltage reference vector.

17. The method of claim 16, further comprising:
    setting the current reference vector as the reference vector that satisfies the torque command, wherein the brushless motor is controlled in a current mode.

18. The method of claim 16, further comprising:
    setting the voltage reference vector as the reference vector that satisfies the torque command, wherein the brushless motor is controlled in a voltage mode.

* * * * *